United States Patent [19]

Watanabe et al.

[11] Patent Number: 5,200,935
[45] Date of Patent: Apr. 6, 1993

[54] RECORDING APPARATUS USING MAGNETO-OPTICAL EFFECT INCLUDING CONTROL MEANS FOR INHIBITING ENERGIZING OF THE LIGHT BEAM GENERATING MEANS IN RESPONSIVE TO CODED DATA

[75] Inventors: Tetsu Watanabe, Tokyo; Tamotsu Yamagami, both of Kanagawa, all of Japan

[73] Assignee: Sony Corporation, Tokyo, Japan

[21] Appl. No.: 608,744

[22] Filed: Nov. 5, 1990

[30] Foreign Application Priority Data

Nov. 21, 1989 [JP] Japan .................................. 1-302369

[51] Int. Cl.[5] ...................... G11B 13/04; G11B 11/12
[52] U.S. Cl. ........................................ 369/13; 360/59; 360/114
[58] Field of Search .......................... 369/13, 116, 121; 360/59, 114; 365/122

[56] References Cited

U.S. PATENT DOCUMENTS 4,998,231 3/1991 Watanabe et al. ................... 360/114

FOREIGN PATENT DOCUMENTS 61-0187141 8/1986 Japan ..................................... 369/13
1-143043 6/1989 Japan .

Primary Examiner—Hoa Nguyen
Attorney, Agent, or Firm—Alvin Sinderbrand; William S. Frommer

[57] ABSTRACT

In a recording apparatus employing a magneto-optical effect, and in which a light beam irradiates a region of a magneto-optical disc while a magnetic field acts on the disc at such region and is modulated by coded data in accordance with a predetermined modulation system; the light beam is intermittently energized by drive pulses, and the energizing of the light beam is inhibited at times corresponding to transitions in the coded data when the ratio Tmin/Tw is greater than 1, in which Tmin is the minimum length between transitions in the coded data and Tw is a window margin for the modulation system employed for modulating the magnetic field.

7 Claims, 4 Drawing Sheets

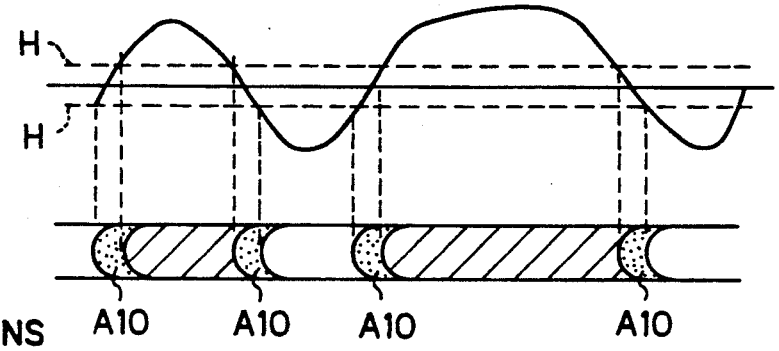
Fig. 1A LASER BEAM
Fig. 1B MAGNETIC FIELD
Fig. 1C STATE OF MAGNETIC DOMAINS
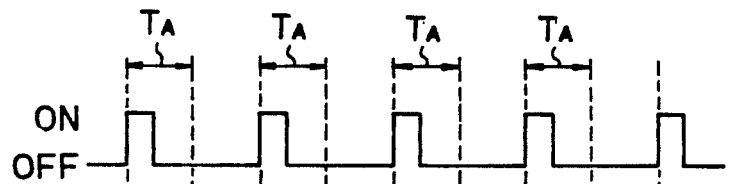
Fig. 2A LASER BEAM
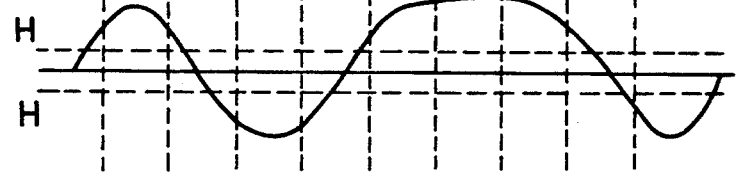
Fig. 2B MAGNETIC FIELD
Fig. 2C STATE OF MAGNETIC DOMAINS

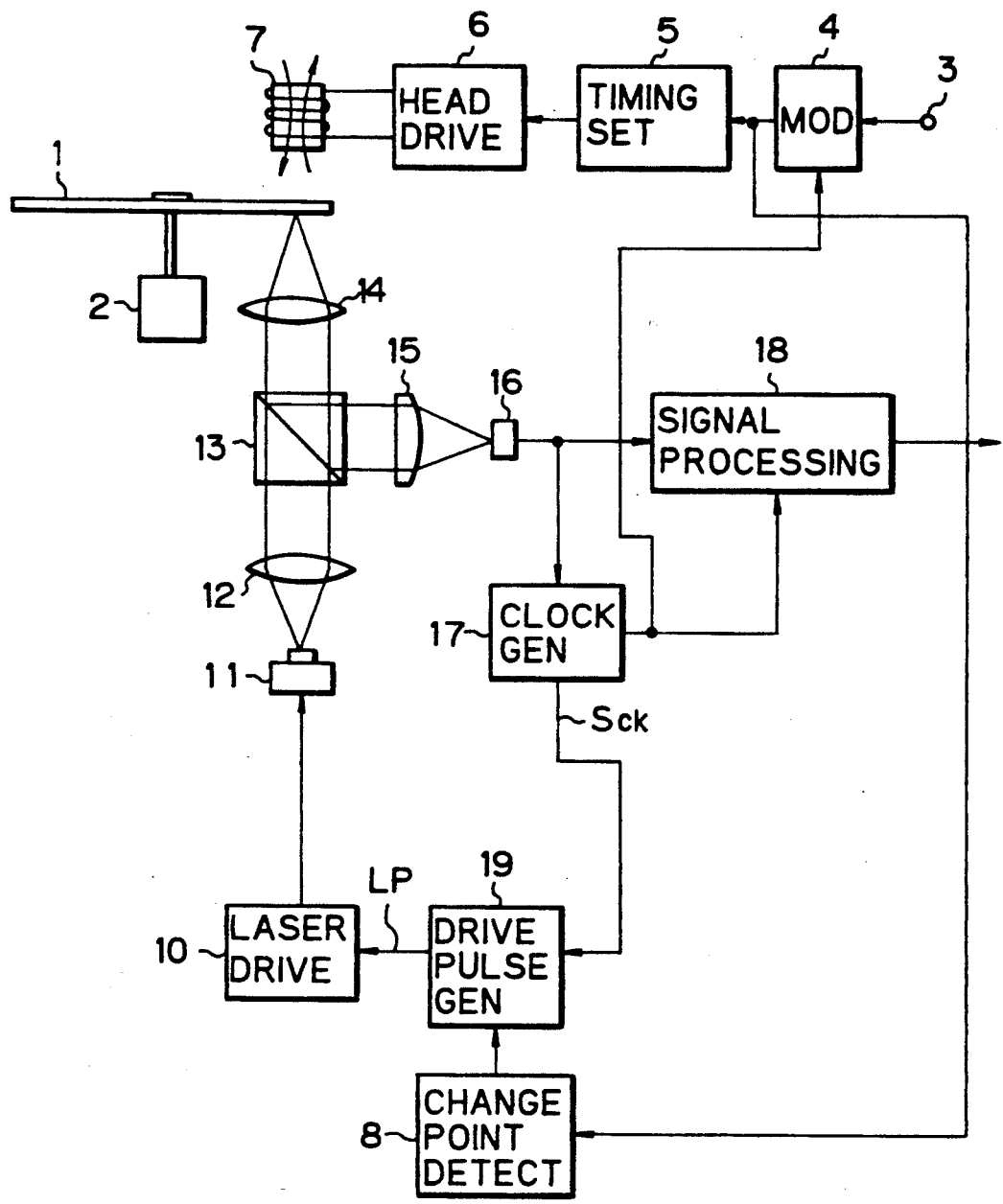

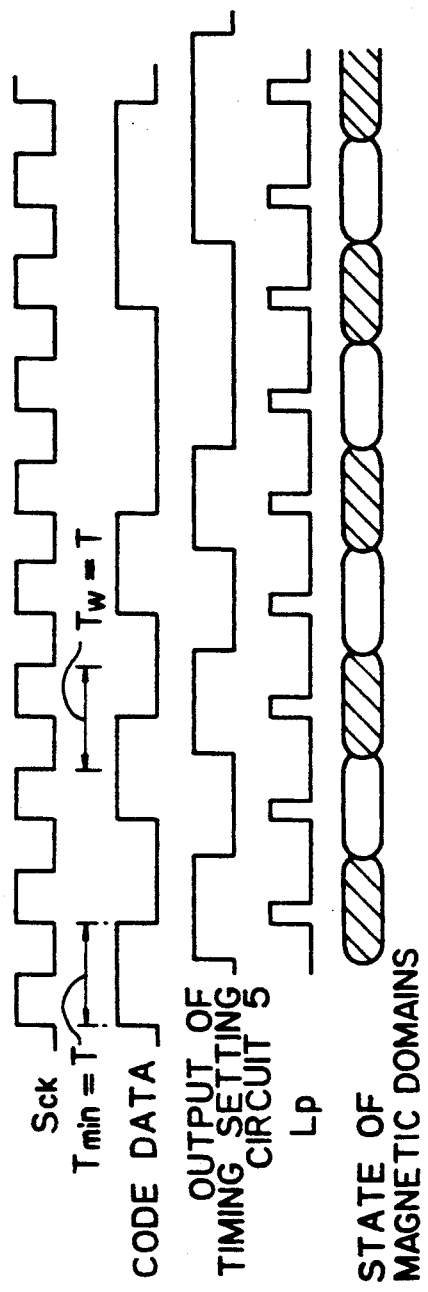
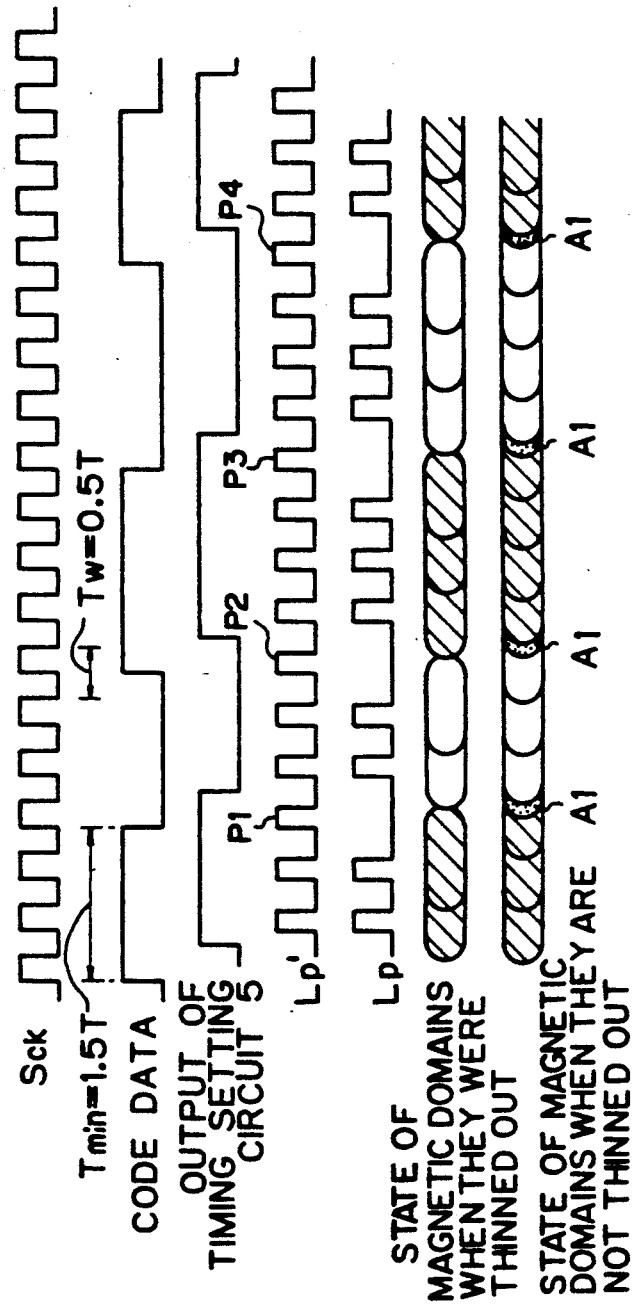

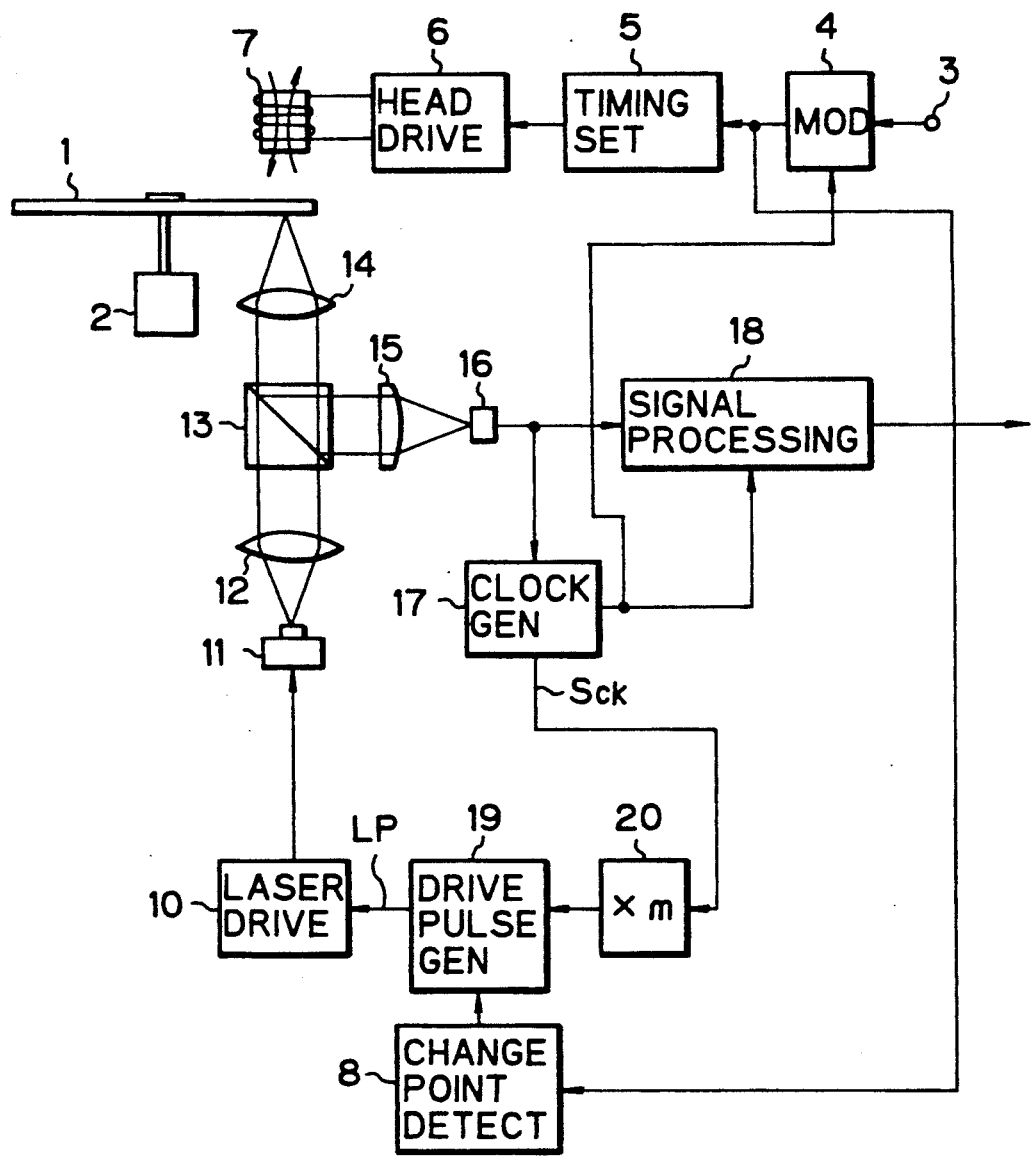

RECORDING APPARATUS USING MAGNETO-OPTICAL EFFECT INCLUDING CONTROL MEANS FOR INHIBITING ENERGIZING OF THE LIGHT BEAM GENERATING MEANS IN RESPONSIVE TO CODED DATA

BACKGROUND OF THE INVENTION

1. Field of the Invention

The present invention relates to a recording apparatus employing a magneto-optical effect for recording an information signal onto a magneto-optical disc and, more particularly, to a magneto-optical recording apparatus having a modulated magnetic field.

2. Description of the Prior Art

In a magneto-optical disc recording/reproducing apparatus having a modulated magnetic field, a laser beam irradiates a region of the recording surface of a magneto-optical disc, and a magnetic field modulated by recording data is applied to such region of the magneto-optical disc for recording the data thereon. According to such a magnetic field modulation system, a so-called overwrite can be executed in which new data are written without erasing earlier written data.

A proposed magneto-optical disc recording/reproducing apparatus of the magnetic field modulating type uses continuous irradiation of the magneto-optical disc by a laser beam. However, in such a magneto-optical disc recording/reproducing apparatus of the magnetic field modulating type using continuous irradiation, it is difficult to produce a magnetization pattern whose orientation is suddenly reversed between adjacent recorded magnetic domains.

More specifically, in the magneto-optical disc, a perpendicular magnetizing film is heated to a Curie temperature Tc or higher during the irradiating time of the laser beam. When an external magnetic field is applied and the perpendicular magnetizing film is then cooled to a Curie temperature Tc or less, the orientation of the magnetic field of the perpendicular magnetizing film is set. Therefore, in order to produce a magnetization pattern whose orientation is suddenly reversed between adjacent magnetic domains, the external magnetic field needs to be maintained at a saturation level or higher until the perpendicular magnetizing film can be cooled to the Curie temperature Tc or less.

In the magneto-optical disc recording/reproducing apparatus of the magnetic field modulating type employing continuous irradiation, the magneto-optical disc is rotated until the region in which a magnetic domain is produced is deviated from a beam spot, and thereafter, such region is cooled. Therefore, the external magnetic field corresponding to the region between input coded data is applied before the perpendicular magnetizing film of the region in which the magnetic domain is produced is cooled to the Curie temperature Tc or less and the orientation of the magnetic field of the perpendicular magnetizing film is set. Accordingly, if the recording data have been inverted, a region in which the magnetization orientation is undetermined is apt to occur between adjacent magnetic domains.

In particular, in the magneto-optical disc recording/reproducing apparatus of the magnetic field modulating type using continuous irradiation, as represented in FIG. 1A, a predetermined laser beam is irradiated onto the magneto-optical disc. As further shown in FIG. 1B, a magnetic field modulated by recording data is applied to the magneto-optical disc. On FIG. 1B, each of the dotted lines H indicates a magnetic saturation level.

When the laser beam is continuously irradiated as described above, the external magnetic field at change or transition points in the input data is applied before the perpendicular magnetizing film can cool to the Curie temperature Tc or less. Therefore, as shown in FIG. 1C, a region A10 whose orientation is undetermined occurs between adjacent recorded magnetic domains.

Therefore, it has been proposed to proved a magneto-optical disc recording/reproducing apparatus of the magnetic field modulating type with a pulsed irradiation, and in which a laser beam is intermittently irradiated onto a magneto-optical disc in response to predetermined reference clocks and a magnetic field modulated by recording data is simultaneously applied with the laser beam irradiation (*International Publication No. WO89/12889*). In such a magneto-optical disc recording/reproducing apparatus of the magnetic field modulating and pulsed irradiation type, since the laser beam is intermittently irradiated, the external magnetic field can be set to a saturation level or higher until the perpendicular magnetizing film can cool to the Curie temperature Tc or lower and the orientation of the magnetization of the perpendicular magnetizing film is set. Thus, a magnetization pattern whose orientation is suddenly reversed between adjacent recorded magnetic domains can be produced.

More specifically, as shown on FIG. 2A, in the magneto-optical disc recording/reproducing apparatus of the magnetic field modulating and pulsed irradiating type, the laser beam is intermittently energized, while, as shown in FIG. 2B, the magnetic field modulated by recording data is applied to the magneto-optical disc.

In such case, the orientation of the magnetization of the perpendicular magnetizing film is determined by the external magnetic field which is applied for a period of time $T_A$ concluding when the temperature of the perpendicular magnetizing film is cooled to the Curie temperature Tc or lower after the laser beam has been energized or turned on for irradiating the magneto-optical disc. Once the temperature of the perpendicular magnetizing film has been cooled to the Curie temperature Tc or lower, the orientation of the magnetization of the perpendicular magnetizing film of the magneto-optical disc does not change.

As shown in FIG. 2B, in the magneto-optical disc recording/reproducing apparatus of the magnetic field modulating and pulsed irradiating type, an external magnetic field of a saturation level H or higher is applied during each time $T_A$. Therefore, as shown in FIG. 2C, a magnetization pattern whose orientation is suddenly reversed between adjacent magnetic domains can be formed.

On the other hand, in the above-described conventional magneto-optical disc recording/reproducing apparatus of the magnetic field modulating and pulsed irradiating type, the minimum number of drive pulses needed to form recorded magnetic domains of one channel bit is determined by the modulation system. More particularly, the minimum number of pulses which are needed to form the recorded magnetic domains of one channel bit is determined by a ratio N of a minimum length Tmin between transitions of the modulation system to a window margin or clock period Tw.

If, for example, a NRZI (Non Return to Zero Inverted) modulation system is utilized in which the minimum length Tmin between transitions is T and the window margin Tw is also T (T denotes a channel byte interval), the minimum number of drive pulses which are needed to form the pits of one channel bit is 1. However, if a 2-7 modulation system is utilized in which, for example, the minimum length Tmin between transitions is 1.5T and the window margin Tw is 0.5T, the minimum number of drive pulses which are needed to form the recorded magnetic domains of one channel bit is 3.

Therefore, even if the recording densities are the same, when the modulation system is changed, then the interval of necessary drive pulses changes. More specifically, if 2-7 modulation is used as the modulation system, then the interval of drive pulses needs to be ⅓ of the interval of drive pulses needed in the case where NRZI modulation is the modulation system.

In the above described magneto-optical disc recording/reproducing apparatus of the magnetic field modulating and pulsed irradiating type, if the interval of drive pulses is reduced by at least a predetermined interval which is determined by the thermal response speed of the magneto-optical disc, the laser beam is energized by the next drive pulse before the perpendicular magnetizing film can cool to the Curie temperature Tc or lower and hence before orientation of the magnetization is set. Accordingly, in this conventional magneto-optical disc recording/reproducing apparatus of the magnetic field modulating are pulsed irradiating type, if the modulation system is changed from NRZI modulation to 2-7 modulation and the interval of drive pulses is reduced, a problem exists in that a magnetization pattern whose orientation is suddenly reversed between adjacent magnetic domains cannot be formed.

Further, another system has been considered in which the thermal response speed of the magneto-optical disc is improved to thereby make it possible to produce a magnetization pattern whose orientation is suddenly reversed between adjacent pits, even in the case where 2-7 modulation is used. However, limitations exist in respect to the possible improvement of the thermal response speed of the magneto-optical disc.

OBJECTS AND SUMMARY OF THE INVENTION

It is therefore an object of the present invention to provide a recording apparatus employing a magneto-optical effect in which a magnetization pattern whose orientation is suddenly reversed between adjacent magnetic domains can be formed irrespective of the modulation system that is used.

According to an aspect of the invention, there is provided, in a recording apparatus employing a magneto-optical effect and having means for generating a light beam for irradiating a magneto-optical disc, means for producing a magnetic field acting on a region of the disc which is irradiated by the light beam, and means responsive to the input coded data for modulating the magnetic field in accordance with a predetermined modulation system, the combination comprising:

means for generating reference clocks
light beam driving means operative in response to the reference clocks to provide drive pulses for energizing the means for generating the light beam to intermittently irradiate the region of the disc; and controlling means for inhibiting the energizing of the means for generating the light beam at times corresponding to the changes or transitions in the input data when a ratio $N=Tmin/Tw$ is greater than 1, in which Tmin is the minimum length between transitions in the coded data and Tw is a window margin for the modulation system employed in modulating the magnetic field.

If the magnetic field is modulated by recording data encoded in accordance with a modulation system which causes the ratio N of the minimum length Tmin between transitions to the window margin Tw ($N=Tmin/Tw$) to be larger than 1, then the laser drive pulses at the positions corresponding to the change points in the input data are thinned out by a drive pulse generating circuit. Therefore, even if the modulation system is changed, a magnetization pattern whose orientation is suddenly reversed between adjacent magnetic domains can be produced.

Further, if the laser drive pulses are produced so as to have a frequency which is a whole multiple of the frequency of the reference clocks, the thinning-out resolution of the drive pulses at the positions corresponding to the change points of the coded data can be improved, whereby a pulse interval can be set according to the ambient temperature and thermal characteristics of the magneto-optical disc.

BRIEF DESCRIPTION OF THE DRAWINGS

FIGS. 1A, 1B and 1C and 2A, 2B and 2C are charts to which reference is made in explaining the operation of conventional magneto-optical disc recording apparatuses of the magnetic field modulating type;

FIG. 3 is a block diagram of an embodiment of the present invention;

FIGS. 4A-4E and 5A-5G are timing charts which are used to explain an embodiment of the invention; and FIG. 6 is a block diagram of another embodiment of the invention.

The above, and other objects, features and advantages of the present invention will become readily apparent from the following detailed description of preferred embodiments thereof when, read in connection with the accompanying drawings, wherein like reference numerals identify the same or similar elements.

DETAILED DESCRIPTION OF THE PREFERRED EMBODIMENTS

An embodiment of the present invention will be described hereinbelow with reference to FIG. 3 of the drawings in which a magneto-optical disc 1 is rotated at a predetermined rotational speed by a spindle motor 2.

Servo patterns are previously formed in servo areas which are arranged at predetermined angular intervals on the magneto-optical disc 1. Reference clocks $S_{CK}$ can be obtained on the basis of reproduction signals which are derived from the servo patterns.

Recording data are supplied through a data input terminal 3 to a modulating circuit 4. The data from the input terminal 3 are modulated by the modulating circuit 4 in accordance with a predetermined modulation system. The 2-7 modulation, the NRZI modulation, or the like can be used as a modulation system.

Modulated recording data output from the modulating circuit 4 are supplied to a magnetic head 7 through a timing circuit 5 and a head driving circuit 6, and are also supplied to a change point detecting circuit 8. The change point detecting circuit 8 detects a change or transition point at which the data output from the modulating circuit 4 changes from the low level to the high level and vice versa. An output of &:he change point detecting circuit 8 is supplied to a drive pulse generating circuit 19.

The timing circuit 5 sets the timing of coded data which are output from the modulating circuit 4 and the timing of the intermittent emitting of a laser beam from a laser diode 11 in accordance with the ambient temperature and the thermal characteristics of the magneto-optical disc 1.

The magnetic head 7 is arranged so as to face the magneto-optical disc 1. The data output from the modulating circuit 4 which were transmitted through the timing circuit 5 and the head driving circuit 6 are supplied to the magnetic head 7. Then, a magnetic field modulated on the basis of the coded data from the modulating circuit 4 is generated by the magnetic head 7 and is applied to the magneto-optical disc 1.

Laser drive pulses LP are supplied by the drive pulse generating circuit 19 to the laser diode 11 via a laser driving circuit 10. Thus, a laser beam is intermittently output from the laser diode 11 on the basis of the laser drive pulses LP.

The laser beam which is emitted from the laser diode 11 is converted into a parallel beam by a collimating lens 12 and is converged onto the magneto-optical disc 1 through a deflecting beam splitter 13 and an objective lens 14. The reflected light from the magneto-optical disc 1 passes through the objective lens 14, the deflecting beam splitter 13, and a condenser lens 15, and is received by a photo diode 16.

An output of the photo diode 16 is supplied to a clock generating circuit 17 and to a signal processing circuit 18.

As mentioned above, servo patterns have previously been formed in servo areas which are arranged at predetermined angular intervals on the magneto-optical disc 1. The reference clocks $S_{CK}$ produced by the clock generating circuit 17 are obtained from reproduction signals which are derived from the servo patterns in the servo areas on the magneto-optical disc 1. These reference clocks $S_{CK}$ are supplied to the modulating circuit 4, the signal processing circuit 18 and the drive pulse generating circuit 19.

The drive pulse generating circuit 19 produces the laser drive pulses LP in accordance with the reference clocks $S_{CK}$. On the other hand, if the recording data are modulated by the modulating circuit 4 in accordance with a predetermined modulation system, which has the ratio N of the minimum length Tmin between transitions to the window margin Tw (N=Tmin/Tw) larger than 1, then the drive pulse generating circuit 19 thins out the laser drive pulses LP at the positions corresponding to the change points in the coded input data.

For example, in the NRZI modulation system, the ratio N of the minimum length Tmin between transitions to the window margin TW is as follows:

$N = Tmin/Tw = 1T/1T = 1$

In the case of a modulation system, such as, the NRZI system, in which the ratio N of the minimum length Tmin between transitions to the window margin Tw is equal to 1, the laser drive pulses Lp are not thinned out.

In the 2-7 modulation, the ratio N of the minimum length Tmin between transitions to the window margin Tw is as follows:

$N = Tmin/Tw = 1.5T/0.5T = 3$

On the other hand, in the case of 1-7 modulation, the ratio N of the minimum length Tmin between transitions to the window margin Tw is as follows:

$N = Tmin/Tw = 1.33T/0.67T = 2$

As noted above, when using a modulation system, such as, the 2-7 or 1-7 modulation system, in which the ratio N of the minimum length Tmin between transitions to the window margin Tw is larger than 1, the laser drive pulses LP at times corresponding to the change points of the coded data are thinned out by n pulses (N>n).

The laser drive pulses LP output from the drive pulse generating circuit 19 are supplied to the laser diode 11 through the laser driving circuit 10. The laser diode 11 intermittently emits a laser beam in response to the laser drive pulses LP.

As mentioned above, the laser beam from the laser diode 11 is converged onto the magneto-optical disc 1 through the collimating lens 12, the deflecting beam splitter 13, and the objective lens 14.

When the laser beam is converged onto the magneto-optical disc 1, the temperature rises at the region of the disc at which the laser beam impinges. When the temperature of the perpendicular magnetizing film of the magneto-optical disc 1 is raised to the Curie temperature Tc or higher, the coercive force of the perpendicular magnetizing film suddenly decreases so that the magnetizing direction of the perpendicular magnetizing film of the magneto-optical disc 1 can then be oriented by the magnetic field generated from the magnetic head 7. Consequently, data is recorded onto the magneto-optical disc 1.

According to an embodiment of the present invention, if recording data are modulated by the modulating circuit 4, as described above, and a modulation system is employed in which the ratio N of the minimum length Tmin between transitions to the window margin Tw (N=Tmin/Tw) is larger than 1, then the laser drive pulses LP are thinned out by the drive pulse generating circuit 19 at times corresponding to change points in the coded data. Therefore, even if a modulation system is utilized in which the minimum number of pulses which are needed to form magnetic domains corresponding to one channel bit is large, a magnetization pattern whose orientation is suddenly reversed between adjacent magnetic domains can still be formed.

The above advantage of the invention will now be further explained with reference to FIGS. 4A-4E and FIGS. 5A-5G.

FIG. 4A shows the reference clocks $S_{CK}$ in the case where NRZI modulation is utilized as a modulation system. In such case, FIG. 4B shows the coded data which are output from the modulating circuit 4.

In the NRZI modulation system, assuming that a channel bit interval is set to T, the minimum length Tmin between transitions is set to T and the window margin Tw is also set to T. Therefore, the ratio N of the minimum length Tmin between transitions and the window margin Tw is equal to 1. In such case, the pulses are not thinned out by the drive pulse generating circuit 19.

In the drive pulse generating circuit 19, laser drive pulses LP, as shown in FIG. 4D, are produced in accordance with the reference clocks $S_{CK}$. As represented by FIG. 4C, the coded data output from the modulating circuit 4 are delayed by the timing setting circuit 5 to an extent dependent upon the ambient temperature and the thermal characteristics of the magneto-optical disc 1.

The laser beam emitted from the laser diode 11 irradiates the magneto-optical disc 1 for a period of time in which each of the laser drive pulses LP shown in FIG. 4D is generated by the drive pulsed generating circuit 19. The coded data, as shown in FIG. 4C, are supplied to the magnetic head 7. Then the magnetic field modulated by the coded data is applied from the magnetic head 7 to the magneto-optical disc 1. Thus, recorded magnetic domains as shown in FIG. 4E are formed on the magneto-optical disc 1.

In this case, if the interval between the laser drive pulses LP is longer than a predetermined period of time which depends upon the thermal response speed of the magneto-optical disc 1, then the external magnetic field at the saturation level or higher is applied for a period of time after the laser beam has been irradiated onto the magneto-optical disc 1 and until the perpendicular magnetizing film has cooled to the Curie temperature Tc. Therefore, as shown in FIG. 4E, even in the case where the coded data have been inverted, a magnetization pattern whose orientation is suddenly reversed between adjacent magnetic domains can be produced.

FIG. 5A shows the reference clocks $S_{CK}$ in the case where 2-7 modulation is utilized as a modulation system. In such case, FIG. 5B shows the coded data which are output from the modulating circuit 4.

In the 2-7 modulation system, assuming that the channel bit interval is set to T, then the minimum length Tmin between transitions is set to 1.5T and the window margin Tw is set to 0.5T. Thus, the ratio N of the minimum length Tmin between transitions to the window margin Tw is equal to 3. In such case, as earlier noted, the laser drive pulses LP which are generated by the drive pulse generating circuit 19 are thinned out at times corresponding to the change points of the coded data.

More specifically, laser drive pulses LP′, as shown in FIG. 5D, are produced on the basis of the reference clocks $S_{CK}$, as represented in FIG. 5A. The laser drive pulses LP′ are thinned out by one pulse at each of the times corresponding to the change points of the coded data, as shown in FIG. 5E. That is, the pulses P1, P2, P3, P4 . . . in FIG. 5D are thinned out.

The coded data from the modulating circuit 4 are delayed by the timing setting circuit 5 according to the ambient temperature and thermal characteristics of the magneto-optical disc, as shown in FIG. 5C.

Once again, the laser beam is emitted from the laser diode 11 for a period of time in which each of the laser drive pulses LP shown in FIG. 5E is generated by the drive pulse generating circuit 19. The coded data, as shown in FIG. 5C, are supplied to the magnetic head 7, and the magnetic field modulated by the coded data is applied from the magnetic head 7 to the magneto-optical disc 1.

Thus, recorded magnetic domains as shown in FIG. 5F are formed on the magneto-optical disc 1. In such case, if the recording density is similar to that when the data were modulated by the NRZI modulation system, as shown in FIG. 5F, then even if the coded data have been inverted, a magnetization pattern whose orientation is suddenly reversed between adjacent recorded magnetic domains can be produced.

That is, by thinning out the laser drive pulses LP at times corresponding to the change points of the input data, the interval of the laser drive pulses LP can be extended with respect to such inverted data change points, as represented in FIG. 5E. Such extended interval of the laser drive pulses LP may be equal to the interval of the laser drive pulses LP in the case where the data is recorded in accordance with the NRZI modulation system. Therefore, if the recording density is similar to that when the data were modulated according to the NRZI modulation system, a magnetization pattern whose orientation is suddenly reversed between adjacent magnetic domains can be produced.

If the data are recorded in accordance with the 2-7 modulation system and it is assumed that the thinning-out operation of the drive pulses at times corresponding to the change points of input data, as described above, is not executed, then a magnetization pattern whose orientation is suddenly reversed between adjacent magnetic domains as mentioned above cannot be produced.

More specifically, if it is assumed that the thinning-out operation at the change points of the input data is not executed and the laser drive pulses LP′, as represented in FIG. 5D, have been supplied to the laser diode 11 and the input data have been recorded, then, in such case, the interval of the drive pulses is equal to ⅓ of that in the case where the data were recorded by the NRZI modulation system. Therefore, before the temperature of the pits produced on the magneto-optical disc 1 can be reduced to the Curie temperature Tc or lower, the next drive pulse is generated. Thus, as shown in FIG. 5G, a period of time A1 occurs between magnetic domains in which magnetization orientation is not decoded.

The number of laser pulses at the change points which are thinned out is set in accordance with the coded data rate, the ambient temperature and thermal characteristics of the magneto-optical disc 1.

Referring now to FIG. 6, another embodiment of the present invention is shown. In this embodiment, there is provided a multiplying circuit 20 for increasing the frequency of the reference clocks $S_{CK}$ generated from the clock generating circuit 17 by m times (m is an integer). Thus, the reference clocks $mS_{CK}$ are supplied to the drive pulse generating circuit 19.

By increasing the frequency of the reference clocks $S_{CK}$ by m times, as mentioned above, the thinning-out resolution of the drive pulses at times corresponding to the change points of the input data can be improved.

For example, if it is assumed that the 2-7 modulation system is employed in which the ratio N of the minimum length Tmin between transitions to the window margin Tw is equal to (N=3), then, in such case, if the laser drive pulses LP are produced by the reference clocks $S_{CK}$, the number of laser drive pulses LP which are needed to form the magnetic domains corresponding to the channel bit (1.5T) is equal to 3. Therefore, two kinds of thinning-out methods are possible. In the first method, one of the three pulses is thinned out at the change points of the input data and in the second method, two of the three pulses are thinned out at the change points of the input data.

If the reference clocks $S_{CK}$ are doubled, for example, the number of laser drive pulses LP which are necessary to produce the magnetic domain of one channel bit (1.5T) is equal to 6. Therefore, the following five kinds of thinning-out methods can be considered: a method whereby one of six pulses is thinned out at the change points; a method whereby two of six pulses are thinned out at the change points; a method whereby three of six pulses are thinned out at the change points; a method whereby four of six pulses are thinned out at the change points; and a method whereby five of six pulses are thinned out at the change points.

Accordingly, the pulse interval of the laser drive pulses LP at the change points can be set to the optimum interval according to the ambient temperature and thermal characteristics of the magneto-optical disc 1.

According to the present invention, if recording data are modulated in accordance with a modulation system in which the ratio N of the minimum length between transition Tmin to the window margin Tw (N=Tmin/Tw) is larger than 1, then the laser drive pulses LP are thinned out by the drive pulse generating circuit 19 at the positions corresponding to the change points in the input data. Therefore, even if the modulation system is changed, a magnetization pattern whose orientation is suddenly reversed between adjacent magnetic domains can be produced.

Further, according to the present invention, the laser drive pulses LP can be produced by increasing the frequency of the reference clocks $S_{CK}$ by m times. Therefore, the thinning-out resolution of the drive pulses at times corresponding to change points of the input data can be improved. The pulse interval of the laser drive pulses LP at the change points can be set according to the ambient temperature and thermal characteristics of the magneto-optical disc 1.

What is claimed is:

1. A magneto-optical recording apparatus, comprising:
    means for generating a light beam for irradiating a region of a magneto-optical disc;
    means for producing a magnetic field acting on said region of the magneto-optical disc;
    means for providing input data to be recorded;
    modulating means for modulating said input data in accordance with a predetermined modulation system so as to provide coded data having a minimum length (Tmin) between transitions thereof and a window margin (Tw) determined by said modulation system;
    means for transmitting and supplying said coded data to said magnetic field producing means so that said magnetic field is modulated in accordance with said coded data;
    means for generating reference clocks;
    light beam driving means operative in response to said reference clocks to provide drive pulses for energizing said means for generating said light beam to intermittently irradiate said region of the disc; and
    control means responsive to said coded data for inhibiting said energizing of said means for generating the light beam at times corresponding to all of said transitions in said coded data when the ratio Tmin/Tw is greater than 1.

2. A magneto-optical recording apparatus according to claim 1; wherein said control means inhibits the energizing of said means for generating the light beam by thinning out at least one of said drive pulses for each of said times corresponding to said transitions.

3. A magneto-optical recording apparatus according to claim 2; wherein said ratio Tmin/Tw is greater than a number n of said drive pulses thinned out for each of said transitions.

4. A magneto-optical recording apparatus according to claim 2; wherein said modulation system employs 2-7 modulation.

5. A magneto-optical recording apparatus according to claim 2; wherein said control means includes means for detecting each of said transitions in said coded data, and means for thinning out said drive pulses in response to each detection of a transition in said coded data.

6. A magneto-optical recording apparatus according to claim 2; wherein said magneto-optical disc has predetermined thermal characteristics, and said control means determines a number of said drive pulses thinned out for each of said transitions in accordance with an ambient temperature and said thermal characteristic of the magneto-optical disc.

7. A magneto-optical recording apparatus, comprising:
    means for generating a light beam for irradiating a region of a magneto-optical disc;
    means for producing a magnetic field acting on said region of the magneto-optical disc;
    means for supplying input data to be recorded;
    modulating means for modulating said input data in accordance with a predetermined modulation system so as to provide coded data having a minimum length (Tmin) between transitions thereof and a window margin (Tw) determined by said modulation system;
    means for transmitting and supplying said coded data to said magnetic field producing means so that said magnetic field is modulated in accordance with said coded data;
    means for generating reference clocks;
    light beam driving means operative in response to said reference clocks to provide drive pulses for energizing said means for generating said light beam to intermittently irradiate said region of the disc, said drive pulses having a frequency which is m times the frequency of said reference clocks, m being an integer; and
    control means responsive to said coded data for inhibiting said energizing of said means for generating the light beam by thinning out said drive pulses at times corresponding to all of said transitions in said coded data when the ratio Tmin/Tw is greater than 1.

* * * * *